UNITED STATES PATENT OFFICE.

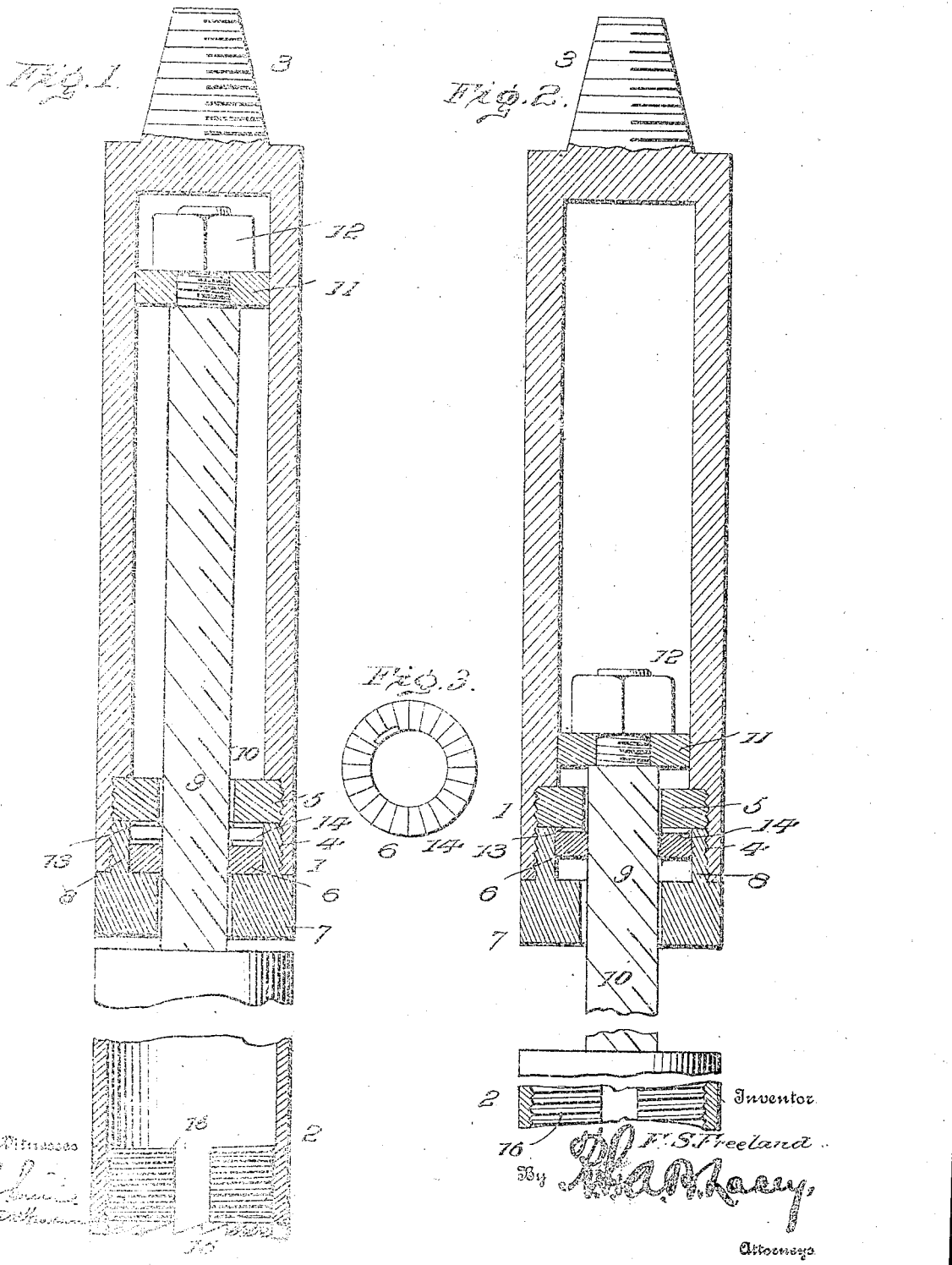

FRONCO S. FREELAND, OF BROOMFIELD, WEST VIRGINIA.

WELL-DRILLING TOOL.

No. 875,516.

Specification of Letters Patent.

Patented Dec. 31, 1907.

Application filed October 29, 1906. Serial No. 341,098.

*To all whom it may concern:*

Be it known that I, FRONCO S. FREELAND, a citizen of the United States, residing at Broomfield, in the county of Marion and State of West Virginia, have invented certain new and useful Improvements in Well-Drilling Tools, of which the following is a specification.

In drilling and operating oil, Artesian and other deep wells, tools and operating devices frequently become broken or otherwise detached from the operating means and require to be fished out. In the event of drills, reamers and like tools used in drilling or boring deep wells, becoming broken, considerable difficulty is experienced in recovering and removing the same and it not unfrequently happens that the well has to be abandoned because of the inability to remove the tool which obstructs further operations.

The present invention provides a tool by means of which a threaded pin is formed upon the upper end of the broken or lost tool, thereby enabling the same to be removed so that the drilling or boring of the well may be proceeded with without entailing loss of the work already expended.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a vertical central section of a tool embodying the invention, showing the relation of the parts when the driver is lowered and disconnected from the operating element by means of which the cutter is rotated. Fig. 2 is a sectional view showing the driver in clutched engagement with the tool operating member. Fig. 3 is a top plan view of the movable operating member.

The tool comprises a driver 1, a cutter 2 and coöperating means for rotating the tool.

The driver 1 is of cylindrical form and is provided at its upper end with a threaded pin 3 for connection of the drill rods or other operating means therewith. The lower end of the driver is enlarged and threaded, as shown at 4, and receives operating members 5 and 6, the member 5 being fixed and the member 6 loose and having a limited play. A cap 7 closes the lower end of the driver 1 and is provided upon its upper side with an exteriorly threaded rim 8 which screws into the lower portion of the driver and clamps the member 5. The members 5 and 6 and the cap 7 are each formed with a central opening through which the shank 9 of the cutter 2 passes, the openings in the parts 5 and 7 being of such a size as to admit of the stem and the threaded portion thereof moving freely therethrough, whereas the opening in the member 6 is internally threaded to correspond with the thread 10 cut or otherwise provided upon the outer side of the stem 9. The thread 10 has a steep pitch and is commonly designated as a quick thread so that movement of the member 6 upon the stem 9 and held from turning during said movement will impart rotation to the stem 9 and cutter 2. The upper end of the stem 9 is reduced to receive a washer 11 and the extremity is threaded to receive a nut 12 by means of which the washer 11 is retained in place. The washer 11 snugly fits the interior bore or opening of the driver 1 and forms a guide for the upper end of the stem as well as a stop to limit the relative upward movement of the driver.

The members 5 and 6 constitute operating elements and are provided upon their meeting faces with teeth which engage upon the descent of the driver and form a clutch connection between the operating elements to cause the cutter to rotate. The member 5 is provided upon its lower face with teeth 13 and the member 6 has corresponding teeth 14 upon its upper side. The member 5 is fast with the driver, whereas the member 6 has a limited vertical play sufficient to bring the teeth 13 and 14 into and out of engagement. The member 6 is arranged within the space of the rim 8. Upon the upward movement of the driver, the member 5 moves away from the member 6 a distance to throw the teeth 13 and 14 out of engagement, thereby admitting of the driver ascending without imparting rotation to the cutter. Upon descent of the driver, the member 5 is brought into clutched engagement with the member 6, thereby holding the latter from relative turning and by reason of the quick thread connection between the stem 9 and the member 6, said stem and the cutter 2 carried thereby are rotated. The driver 1 may be reciprocated in any manner and is adapted to be connected to the walking beam of any oil well drilling or operating mechanism. The cutter 2 is of cylindrical form and is provided at its lower end with a series of cutting teeth 15 which are designed to cut away the outer portion of a tool or other part in the well so as to form a pin thereon. A die or thread cutter 16 is provided upon the inner side of the cutter 2 adjacent to the teeth 15 and forms a thread upon the pin as the latter is cut. The die or thread cutter 16 may be of usual construction and consists of a series of threaded sections upon the inner side of the cutter 2. It is to be understood that the cutter 2 is of best tool steel highly tempered so as to retain a cutting edge and insure the successful operation of the tool when employed for removing a drill, reamer or other part that may become broken and lodged in the well.

Having thus described the invention, what is claimed as new is:

In a device of the character described, the combination of a tubular driver having the opening therethrough enlarged and interiorly threaded at one end thereof, an apertured cap fitting over the said end of the driver and provided with an exteriorly threaded rim received by the enlarged portion of the opening through the driver, an apertured operating member fitting in the enlarged portion of the opening of the driver and clamped in position by means of the cap, a cutter provided with a threaded stem extending through the perforations in the cap and before mentioned operating member and movable longitudinally within the driver, a second operating member having a threaded connection with the stem and fitting loosely between the cap and the first mentioned operating member, and means for securing a clutch connection between the two operating members when the driver is moved in one direction.

In testimony whereof I affix my signature in presence of two witnesses.

FRONCO S. FREELAND. [L. S.]

Witnesses:
A. F. MILLAN,
J. S. LEGGETT.